(No Model.)
C. GREEN.
COLLAPSIBLE TRUCK.
No. 605,224. Patented June 7, 1898.
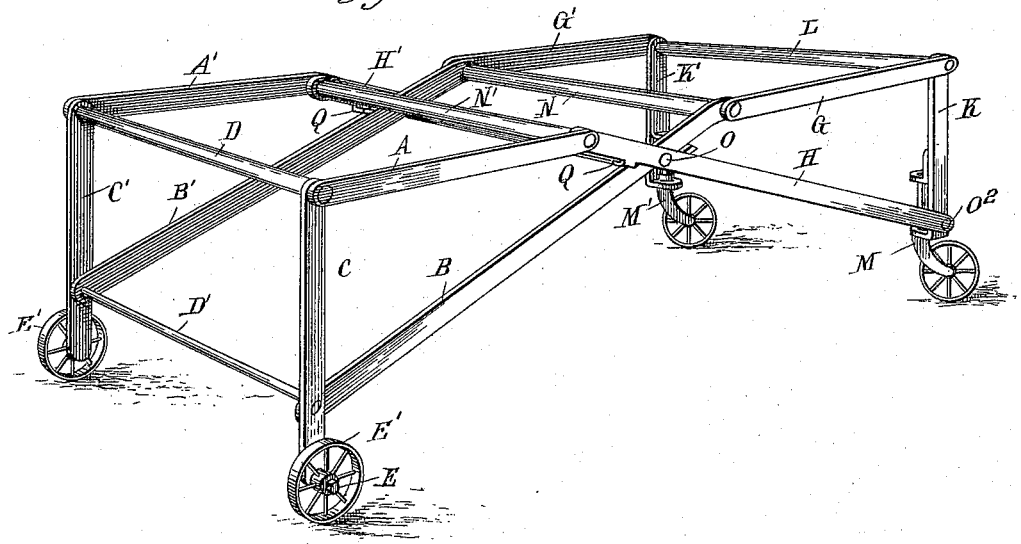
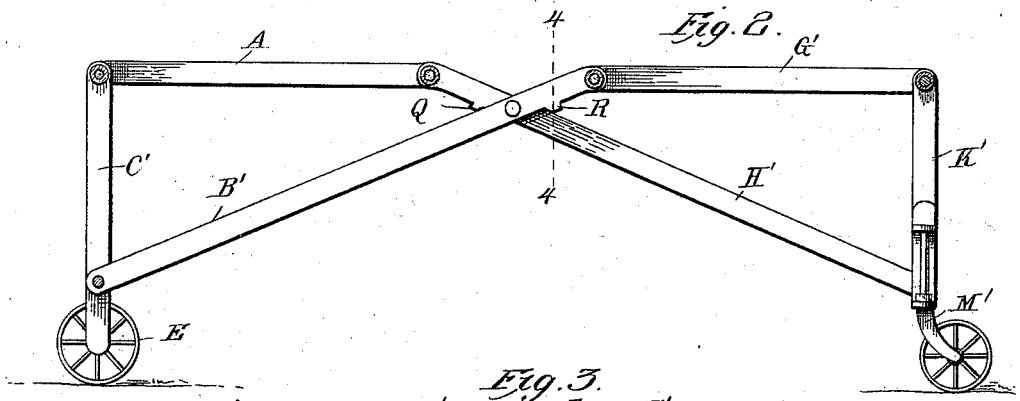
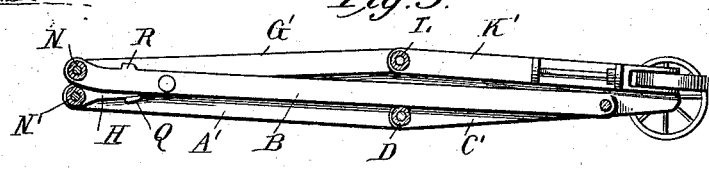
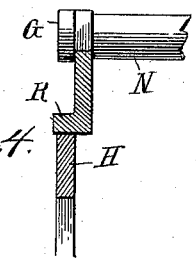
Witnesses
T. W. Riley,
Chas. E. Brock,
Inventor
Casper Green
by O'Meara
Attorneys

UNITED STATES PATENT OFFICE.

CASPER GREEN, OF DUBLIN, INDIANA, ASSIGNOR OF ONE-HALF TO OTTIE CRANOR AND JAMES HAMMON, OF SAME PLACE.

COLLAPSIBLE TRUCK.

SPECIFICATION forming part of Letters Patent No. 605,224, dated June 7, 1898.

Application filed October 15, 1897. Serial No. 655,285. (No model.)

*To all whom it may concern:*

Be it known that I, CASPER GREEN, residing at Dublin, in the county of Wayne and State of Indiana, have invented a new and useful Collapsible Truck or Carriage, of which the following is a specification.

This invention relates to improvements in folding trucks or carriages, and has for its object to provide a light, strong, and durable device of this character adapted to sustain burdens of any reasonable weight and upon which they may be wheeled from one location to another.

My improved device is especially adapted for the moving of coffins or burial-cases containing corpses from one apartment to another and at railway-depots and may be utilized for moving furniture or other articles.

In the drawings herewith forming a part of this specification, in which like parts are indicated by similar letters of reference, Figure 1 is a perspective view of my improved truck or carriage. Fig. 2 is a vertical longitudinal section of the carriage in an operative position. Fig. 3 is a view of the carriage in a folded position. Fig. 4 is a section on line 4 4 of Fig. 2.

My improved folding truck or carriage consists, essentially, of two portions joined together at their longitudinal centers, each portion being similarly constructed excepting in a slight variation. One of said end portions is composed of portions A and A', B and B', and C and C', pivoted together by means of pivotal rods D and D', as shown. In an unfolded position the portions A and A' will be horizontal, B and B' inclined, and C and C' vertical. The vertical portions C and C' are provided upon their lower ends with suitable trunnions E, upon which are mounted wheels or rollers E'. The other portion of the frame consists of strips G and G', H and H', and K and K', the first two named being the horizontal portion, H and H' the inclined portion, and K and K' the vertical portion, the said vertical portions being provided at their lower ends with casters M and M' and are joined at their upper ends by means of transverse pivot-rods L, which also connect the ends of the horizontal portions G and G'. The strips B and G and the strips B' and G' are connected together by means of a transverse pivot-rod N, and the strips A and A' and H and H' are in similar manner pivoted together by means of the pivot-rod N'. The inclined portions B and H and B' and H' are also pivoted together by means of pivot-pins O, and the vertical portions K and K' are respectively pivoted to the inclined portion H and H' by means of pivot-pins O². The parts are thus all pivoted to each other, the ends being of substantially the same construction, excepting that the pivot-rod D' is omitted on the opposite end of the frame in consequence of the casters being used at that end.

Upon the portions H and H', I provide inwardly-projected leaf lugs or ears Q, and upon the portions B and B', I provide similar lugs R, extended outwardly, the object of these lugs being to mutually support the adjacent inclined portion of the frame, so that the horizontal portions A and A' and G and G' cannot descend below said plane. The casters M are provided at one end of the frame, so that the frame may be pushed in any desired direction, the pushing being done preferably at that end.

The carriage, as above set forth, has been described in its operative position ready to receive a burial-case or other burden. When it is desired to fold the same into the position shown in Fig. 3, the two pivot-rods N and N' are grasped and lifted upwardly, upon which the two ends of the frame will fold together into the position shown, all the strips assuming a nearly vertical position. In such position the carriage may be laid flatly upon the ground or floor or inclined against the wall, as may be preferred, and in this position it may be stored or shipped in a very small compass.

Having thus fully described my invention, what I claim as new, and desire to secure by means of Letters Patent, is—

1. The combination in a folding truck, of two pairs of end uprights C, C' and K, K', two pairs of horizontal top bars A, A' and G, G', each pair being pivoted at its outer ends to the upper ends of the end uprights, the inclined bars B, B' pivotally connected at their outer lower ends to the end uprights C, C' and at their inner upper ends to the inner ends of the horizontal top bars G, G', and the inclined bars H and H' pivoted at their lower outer ends to the uprights K, K' and at their inner upper ends to the inner ends of the top bars A, A', the two pairs of bars B, B' and H, H' being crossed near their inner upper ends and pivotally connected together at their crossing, substantially as described.

2. The combination in a folding truck, of end uprights and horizontal top bars, with inclined bars pivotally connecting the inner ends of the top bars with the lower ends of the opposite end uprights, said inclined bars being crossed near their inner upper ends and pivoted together, and each of them being provided with a laterally-projecting stop, substantially as described.

3. The combination in a folding truck, of end uprights C, C' and K, K', top bars A, A' and G, G' and inclined bars B, B' and H, H', cross-bar D' pivotally connecting the outer lower ends of the inclined bars B, B' with the lower ends of the upright bars C, C', the cross-bar D pivotally connecting the outer ends of the top bars A, A' with the upper ends of the end uprights C, C', the cross-bar N' pivotally connecting the inner ends of the top bars A, A' with the upper ends of the inclined bars H and H', the cross-bar O pivotally connecting the two sets of inclined bars B, B' and H, H' at their point of crossing near their inner upper ends, the cross-bar N pivotally connecting the upper ends of the inclined bars B, B' with the inner ends of the top bars G, G', the cross-bar L pivotally connecting the outer ends of the top bars G, G' with the upper ends of the end uprights K, K', the pins $O^2$ pivotally connecting the lower ends of the inclined bars H, H' with the lower ends of the uprights C, C', and casters M, M' mounted on the lower ends of the uprights K, K', substantially as described.

CASPER GREEN.

Witnesses:
JAMES H. BOWLES,
DEVITT C. RIDENOUR.